April 25, 1950 T. A. O. GROSS ET AL 2,505,670
TRANSCEIVER FOR MULTICHANNEL RADIO COMMUNICATION SYSTEMS
Filed Nov. 28, 1947 2 Sheets-Sheet 1

INVENTORS
THOMAS A. O. GROSS
KENNETH A. YOUNG
BY Elmer J. Gorn
ATTORNEY

INVENTORS
THOMAS A. O. GROSS
KENNETH A. YOUNG
BY Elmer J. Gorn
ATTORNEY

Patented Apr. 25, 1950

2,505,670

UNITED STATES PATENT OFFICE 2,505,670

TRANSCEIVER FOR MULTICHANNEL RADIO COMMUNICATION SYSTEMS

Thomas A. O. Gross, Cambridge, and Kenneth A. Young, Waban, Mass., assignors to Raytheon Manufacturing Company, Newton, Mass., a corporation of Delaware Application November 28, 1947, Serial No. 788,504

3 Claims. (Cl. 250—13)

Figure 1:
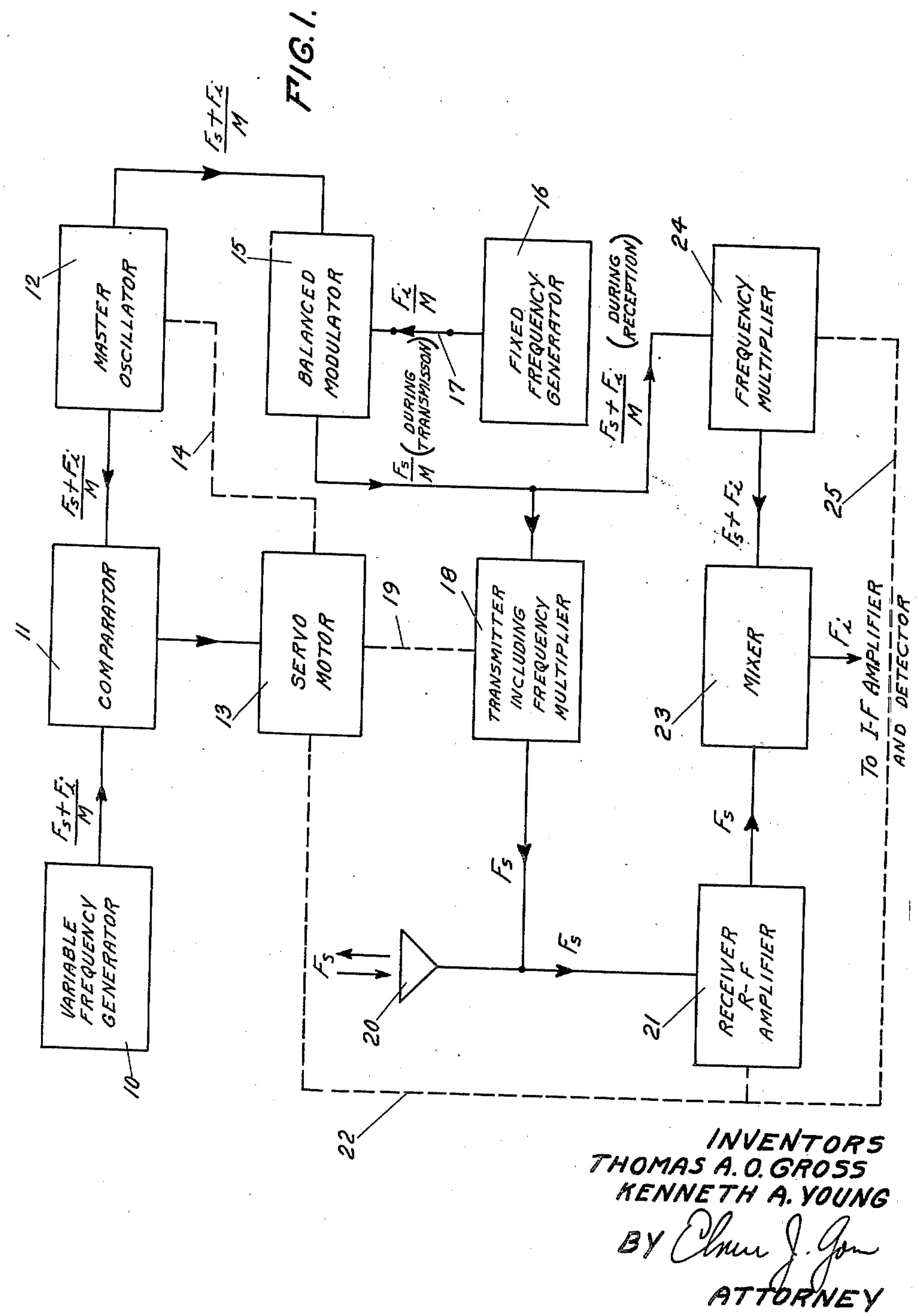

This invention relates to multi-channel communication systems, and more particularly to transceivers therefor.

Existing multi-channel communication systems can be classified, broadly, into two groups. One group employs a variable master oscillator for supplying drive for the transmitter and local oscillator voltage for the receiver. This oscillator is adjusted to approximate frequency by counting a predetermined number of beats produced by combining its output with the output of a crystal-controlled reference oscillator. The other group employs a crystal-controlled oscillator the output of which is directly utilized to compound harmonics and sub-harmonics of the frequency of said oscillator and thereby synthesize the desired transmission and reception frequencies.

Both of these groups have certain disadvantages. In the first, the system is quite complicated due to the necessity for the counting process. In addition, there exists the possibility of miscounting and ending up on the wrong channel. Furthermore, compromise must be made between employing a high and a low intermediate frequency in the receiver, a high frequency being desirable in order to reject image responses and a low frequency being desirable in order to permit quick retuning of the oscillator in changing over from a transmitting to a receiving condition. In the second, the synthesizing of frequencies by compounding harmonics and sub-harmonics of a fixed, initial frequency results inevitably in the production of unwanted frequencies which are difficult to eliminate and which, if permitted to enter the transmitter, cause the radiation of spurious sidebands. In addition, the injection of these unwanted frequencies into the receiver develops objectionable multiple responses.

It is, therefore, among the objects of the present invention to provide a transceiver for a multi-channel communication system which eliminates the foregoing disadvantages.

It is another object of the present invention to provide a transceiver for a system of the general character indicated which, because at any one time only one dominant frequency exists to which the master oscillator must be tuned and held, includes relatively simple frequency-controlling components.

It is still another object of the present invention to provide a transceiver in which there is no restriction on the intermediate frequency used in the system and which, at the same time, permits practically instantaneous changeover from transmitting to receiving conditions, and vice versa.

It is a further object of the present invention to provide a transceiver of the type described in which the frequency synthesizer is simplified in that it is only necessary that the desired frequency be dominant, small amplitude spurious frequencies being tolerable.

These, and other objects which will become apparent as the detailed description of the present invention progresses, are attained, broadly, in the following manner.

The output of a selective frequency synthesizer, for example, of the type described and claimed in the copending application of Kenneth A. Young, entitled Harmonic frequency selectors, Ser. No. 744,623, filed April 29, 1947, which output is intended to be of a frequency corresponding to an arithmetic function, preferably, the sum, of a desired carrier frequency and the fixed intermediate frequency of the system, and the output of a master oscillator, adapted to generate oscillations of any of the frequencies within the band encompassed by said synthesizer, are combined in a comparator for comparing the frequencies thereof and generating a unidirectional voltage, the magnitude and direction of which are functions, respectively, of the magnitude and direction of any frequency difference therebetween. Said unidirectional voltage is utilized to drive a servomotor, to which the frequency-controlling circuit of said master oscillator is mechanically coupled, whereby said master oscillator is tuned to the selected frequency of said synthesizer, and the output of said comparator becomes zero. The output of the master oscillator, which is, as above indicated, tuned to and held at the same frequency as that selected by the synthesizer, and the output of a fixed frequency generator, which produces oscillations of the intermediate frequency of the system, are combined in a balanced modulator to obtain, preferably, the difference therebetween, which is the desired carrier frequency. The latter drives a transmitter which is also mechanically coupled to the aforementioned servomotor and adapted to be tuned thereby to accept said carrier frequency, and the transmitter radiates said carrier into space.

As the master oscillator and the transmitter are being tuned as above, the radio-frequency section of a receiver, which is, likewise, mechanically coupled to the aforementioned servomotor, is also tuned to the carrier frequency, so that when transmission has ceased, the receiver is conditioned to accept any reply from space. During reception, the above referred to balanced modulator is unbalanced in order to produce local oscillator voltage of a frequency corresponding to that of the master oscillator, namely, the sum of the selected carrier and the fixed intermediate frequencies. The local oscillator voltage thus obtained is combined, in a mixer, with the carrier from the radio-frequency section of the receiver and there is thereby recovered the intermediate frequency of the system. The latter may then be amplified and detected or demodulated in a conventional manner.

A transceiver comprising the foregoing eliminates the disadvantages of the prior art and provides the advantages set forth in earlier portions of this specification.

In the accompanying specification there shall be described, and in the annexed drawings shown, an illustrative embodiment of the transceiver of the present invention. It is, however, to be clearly understood that the present invention is not to be limited to the exact details herein shown and described for purposes of illustration only, inasmuch as changes may be made therein without the exercise of invention and within the true spirit and scope of the claims hereto appended.

Figure 2:
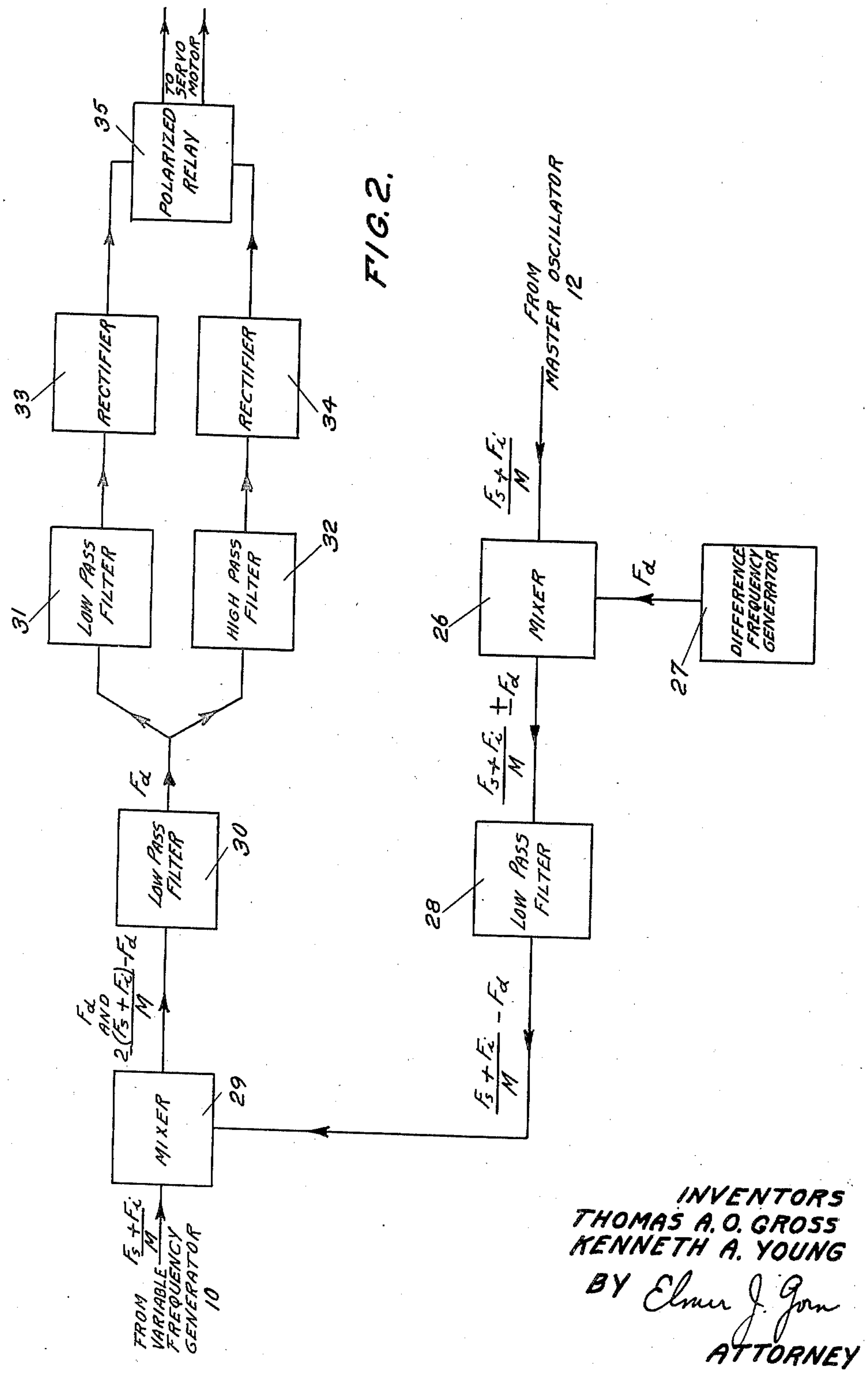

In said drawings,

Fig. 1 is a block diagram of a transceiver assembled in accordance with the present invention; and Fig. 2 is a block diagram of a comparator, one of the components of said transceiver.

Referring now more in detail to the aforesaid illustrative embodiment of the present invention, with particular reference to Fig. 1 of the drawings, the numeral 10 designates a variable frequency generator, known as a frequency synthesizer, for example, of the type disclosed in the previously mentioned copending application of Kenneth A. Young. For the purposes of this specification, it will be assumed that the system of which the transceiver of the present invention is a part is intended to operate in the band from 100 to 200 mc./sec., in steps of .01 mc./sec., thereby making available 1000 carrier frequencies hereinafter individually designated as $F_s$. It will further be assumed that the system utilizes a fixed intermediate frequency $F_i$ of 50 mc./sec. and a frequency multiplication factor, M, of 5.

In accordance with the teachings of the present invention, the synthesizer 10 should therefore be designed selectively to generate, in steps of .02 mc./sec., any frequency $$\frac{F_s+F_i}{M}$$

in the band from 30 to 50 mc./sec., in other words, a pre-fixed order sub-harmonic, namely, the fifth sub-harmonic, of a fundamental frequency corresponding to an arithmetic function, preferably, the sum of the desired carrier frequency $F_s$ and the fixed intermediate frequency $F_i$.

The output $$\frac{F_s+F_i}{M}$$

of the generator 10 is fed to a comparator 11, which will hereinafter be described in detail, as is the output of a master oscillator 12, which is adapted to generate any frequency in the band encompassed by the synthesizer, in order that the frequencies of said synthesizer and master oscillator may be compared. The comparator 11 is such that if the two frequencies fed thereto are alike, no output results, but if there is a difference between these two frequencies, a unidirectional voltage is produced, the magnitude and direction of which are functions, respectively, of the magnitude and direction of said frequency difference. Said unidirectional output is applied to a servomotor 13 which is mechanically coupled, as indicated by the broken line 14, to the frequency-controlling circuit of the oscillator 12, said motor thereby tuning said oscillator until the frequency of the output of the latter is, like that of the synthesizer 10, $$\frac{F_s+F_i}{M}$$

Thus, by continuously comparing the frequency of the oscillator 12 with that of the synthesizer 10, the former is maintained in synchronism with the latter.

A portion of the output of the oscillator 12 is applied to a balanced modulator 15. The output of a fixed frequency generator 16, which is adapted to generate the above-mentioned pre-fixed order sub-harmonic of the intermediate frequency of the system, $$\frac{F_i}{M}$$

in the case under consideration, 10 mc./sec., is also applied, through a switch 17, to the balanced modulator 15. The output of the balanced modulator contains the sum and difference frequencies of the input thereto, namely, $$\frac{F_s+2F_i}{M}$$

$$\frac{F_s}{M}$$

A transmitter 18, which includes appropriate frequency multiplier stages having a total multiplication factor M, and appropriate power amplification stages, is mechanically coupled, as indicated by the broken line 19, to the servomotor 13, whereby as the master oscillator is tuned to a frequency of $$\frac{F_s+F_i}{M}$$

the transmitter is tuned to accept the difference frequency $$\frac{F_s}{M}$$

and reject the sum frequency $$\frac{F_s+2F_i}{M}$$

both of which are fed thereto from the balanced modulator 12. The output of the transmitter 18 is, therefore, the desired carrier frequency $F_s$ which may be radiated by an antenna 20. While not shown, the carrier $F_s$ may be modulated with any desired intelligence.

As the master oscillator 12 and the transmitter 18 are being tuned as aforesaid, the radio-frequency amplifier section 21 of a receiver, which, as indicated by the broken line 22, is also mechanically coupled to the servomotor 13, is tuned to the selected carrier frequency $F_s$, and as said carrier frequency is received from space, it is passed on to a mixer 23.

All that it is necessary to do in order to extract the intelligence from the received carrier is to also apply to the mixer 23 local oscillator voltage. This may be obtained by unbalancing the balanced modulator 15, for example, by opening the switch 17 and interrupting the application to said modulator of the fixed frequency $$\frac{F_i}{M}$$

from the generator 16. This permits the modulator 15 to pass the master oscillator frequency $$\frac{F_s+F_i}{M}$$

which is then applied to a frequency multiplier 24 having a multiplication factor M and being tunable, through a mechanical coupling, indicated by the broken line 25, with the servomotor 13, to the appropriate frequency.

The output of the multiplier 24, $F_s+F_i$, is fed to the mixer 23, permitting the recovery of the intermediate frequency of the system, $F_i$, which may then be suitably amplified and demodulated in a conventional manner.

Turning now to a description of the comparator 11, with special reference to Fig. 2 of the drawings, it is to be understood that all of the components indicated in Fig. 2 by the labeled blocks are included in the single block labeled Comparator in Fig. 1.

In order to maintain a zero difference between the frequencies of the synthesizer 10 and master oscillator 12, it is preferred first to transform a portion of the output of the oscillator 12 to a frequency differing from the frequency of the synthesizer by a predetermined center frequency $F_d$, and then to utilize the magnitude and direction of any deviation of said frequency $F_d$ to control the tuning of the master oscillator and the other components of the transceiver which are linked with the servomotor 13.

For this purpose, a portion of the output $$\frac{F_s+F_i}{M}$$

from the master oscillator 12 is fed to a mixer 26, as is the output $F_d$ of a fixed difference frequency generator 27. This produces sum and difference frequencies $$\frac{F_s+F_i}{M}\pm F_d$$

These frequencies are applied to a low pass filter 28 which rejects the sum frequency and passes the difference frequency. The latter is fed to another mixer 29 which is also receptive of a portion of the output of the generator or synthesizer 10. This again produces sum and difference frequencies $$\frac{2(F_s+F_i)}{M}-F_d \text{ and } F_d$$

These frequencies are applied to another low pass filter 30 which rejects the sum frequency and passes only $F_d$. The latter may be applied to a discriminator having a center frequency $F_d$ whereby a unidirectional voltage may be obtained, the magnitude and direction of which are functions, respectively, of the magnitude and direction of any deviation of the input thereto from the frequency $F_d$.

For this purpose, the output of the filter 30 may be applied in parallel to low and high pass filters 31 and 32 having response curves which cross at the frequency $F_d$. The outputs of the filters 31 and 32 are fed, respectively, to rectifiers 33 and 34, and the outputs of the rectifiers may be combined in opposition in a polarized relay 35, the latter controlling the speed and direction of rotation of the servomotor 13.

Thus, should the output of the master oscillator 12 drift above the frequency desired thereof, the input frequency to the discriminator will shift below the frequency $F_d$; the filter 31 will pass an increased output; and the relay 35 will become unbalanced in one direction. On the other hand, should the oscillator output drift below the desired frequency, the discriminator input will be of a frequency higher than $F_d$; the output of the filter 32 will be increased; and the relay 35 will become unbalanced in the opposite direction. Of course, where there is no drift in the oscillator output frequency, the relay 35 remains in a neutral position and the servomotor 13 remains at rest.

This completes the description of the aforesaid illustrative embodiment of the transceivers of the present invention, together with a description of the mode of operation thereof. It will be noted from all of the foregoing that by means of the present invention, the various disadvantages of the prior art systems, referred to in earlier portions of this specification, are substantially eliminated. It will also be noted that because it is necessary merely that the desired frequency be dominant rather than exclusive, the frequency synthesizer may be of simpler design than has heretofore been required. Still further, it will be noted that because it is not necessary to retune the transceiver when changing over from transmitting to receiving conditions, there is no restriction on the intermediate frequency to be employed and said intermediate frequency may be high so as to eliminate image response.

Other objects and advantages of the present invention will readily occur to those skilled in the art to which the same relates.

What is claimed is:

1. A transceiver comprising: means for selectively generating first electrical oscillations of a frequency corresponding to any one of a multiplicity of predetermined frequencies, said one frequency constituting an arithmetic function of a desired carrier frequency and a pre-fixed intermediate frequency; a free-running oscillator adapted to generate second electrical oscillations of any frequency within the band including said predetermined frequencies; means, receptive of said first and second electrical oscillations, for comparing the frequencies thereof and deriving therefrom a unidirectional output the magnitude and direction of which are functions, respectively, of the magnitude and direction of any frequency difference therebetween; means, receptive of said unidirectional output, for tuning said free-running oscillator whereby said frequency difference is maintained at zero; means for generating third electrical oscillations of a frequency corresponding to said pre-fixed intermediate frequency; means, receptive of said second and third electrical oscillations, for mixing the same and deriving therefrom fourth electrical oscillations of a frequency corresponding to said carrier frequency; means, receptive of said fourth electrical oscillations, for radiating the same into space; means, coupled to and tunable by said tuning means, for receiving from space fifth electrical oscillations of a frequency corresponding to said carrier frequency; and means, receptive of said second and fifth electrical oscillations, for mixing the same and deriving therefrom sixth electrical oscillations of a frequency corresponding to said pre-fixed intermediate frequency.

2. A transceiver comprising: means for selectively generating first electrical oscillations of a frequency corresponding to any one of a multiplicitiy of predetermined frequencies, said one frequency constituting a pre-fixed order sub-harmonic of a fundamental frequency corresponding to an arithmetic function of a desired carrier frequency and a pre-fixed intermediate frequency; a free-running oscillator adapted to generate second electrical oscillations of any frequency within the band including said predetermined frequencies; means, receptive of said first and second electrical oscillations, for comparing the frequencies thereof and deriving therefrom a unidirectional output the magnitude and direction of which are functions, respectively, of the magnitude and direction of any frequency difference therebetween; means, receptive of said unidirectional output, for tuning said free-running oscillator whereby said frequency difference is maintained at zero; means for generating third electrical oscillations of a frequency corresponding to said pre-fixed order sub-harmonic of said pre-fixed intermediate frequency; means, receptive of said second and third electrical oscillations, for mixing the same and deriving therefrom fourth electrical oscillations of a frequency corresponding to said pre-fixed order sub-harmonic of said carrier frequency; means, receptive of said fourth electrical oscillations, for multiplying the frequency thereof by the reciprocal of said pre-fixed order sub-harmonic to obtain fifth electrical oscillations of a frequency corresponding to said carrier frequency, and radiating the same into space; means, coupled to and tunable by said tuning means, for receiving from space sixth electrical oscillations of a frequency corresponding to said carrier frequency; means, coupled to an tunable by said tuning means and receptive of a portion of said second electrical oscillations, for multiplying the frequency thereof by said reciprocal to obtain seventh electrical oscillations of a frequency corresponding to said fundamental frequency; and means, receptive of said sixth and seventh electrical oscillations, for mixing the same and deriving therefrom eighth electrical oscillations of a frequency corresponding to said pre-fixed intermediate frequency.

3. A transceiver comprising: means for selectively generating first electrical oscillations of a frequency corresponding to any one of a multiplicity of predetermined frequencies, said one frequency constituting a pre-fixed order sub-harmonic of a fundamental frequency corresponding to an arithmetic function of a desired carrier frequency and a pre-fixed intermediate frequency; a free-running oscillator adapted to generate second electrical oscillations of any frequency within the band including said predetermined frequencies; means, receptive of said first and second electrical oscillations, for comparing the frequencies thereof and deriving therefrom a unidirectional output the magnitude and direction of which are functions, respectively, of the magnitude and direction of any frequency difference therebetween; means, receptive of said unidirectional output, for tuning said free-running oscillator whereby said frequency difference is maintained at zero; means for generating third electrical oscillations of a frequency corresponding to said pre-fixed order sub-harmonic of said pre-fixed intermediate frequency; a balanced modulator receptive of said second and third electrical oscillations, for mixing the same and deriving therefrom fourth electrical oscillations of a frequency corresponding to said pre-fixed order sub-harmonic of said carrier frequency; means, receptive of said fourth electrical oscillations, for multiplying the frequency thereof by the reciprocal of said pre-fixed order sub-harmonic to obtain fifth electrical oscillations of a frequency corresponding to said carrier frequency, and radiating the same into space; means, coupled to and tunable by said tuning means, for receiving from space sixth electrical oscillations of a frequency corresponding to said carrier frequency; means for interrupting the application of said third electrical oscillations to said balanced modulator and thereby deriving therefrom seventh electrical oscillations corresponding in frequency to the frequency of said second electrical oscillations; means, coupled to and tunable by said tuning means and receptive of seventh electrical oscillations, for multiplying the frequency thereof by said reciprocal to obtain eighth electrical oscillations of a frequency corresponding to said fundamental frequency; and means, receptive of said sixth and eighth electrical oscillations, for mixing the same and deriving therefrom ninth electrical oscillations of a frequency corresponding to said pre-fixed intermediate frequency.

THOMAS A. O. GROSS.
KENNETH A. YOUNG.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 1,789,364 | Hansell | Jan. 20, 1931 |
| 1,876,107 | Usselman | Sept. 6, 1932 |
| 2,281,982 | Leyn | May 5, 1942 |
| 2,317,547 | McRae | Apr. 27, 1943 |
| 2,379,395 | Ziegler et al. | June 26, 1945 |
| 2,408,826 | Vogel | Oct. 8, 1946 |
| 2,419,593 | Robinson | Apr. 29, 1947 |
| 2,434,293 | Stearns | Jan. 13, 1948 |
| 2,452,601 | Ranger | Nov. 2, 1948 |
| 2,453,988 | Guanella | Nov. 16, 1948 |
| 2,460,781 | Cantelo | Feb. 1, 1949 |
| 2,475,064 | Van Weel | July 5, 1949 |

FOREIGN PATENTS

| Number | Country | Date |
|---|---|---|
| 551,472 | Great Britain | Feb. 24, 1943 |